United States Patent
Srinivasan et al.

(10) Patent No.: US 7,363,477 B2
(45) Date of Patent: Apr. 22, 2008

(54) METHOD AND APPARATUS TO REDUCE MISPREDICTION PENALTY BY EXPLOITING EXACT CONVERGENCE

(75) Inventors: Srikanth T. Srinivasan, Portland, OR (US); Amit V. Gandhi, Portland, OR (US); Haitham H. Akkary, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 403 days.

(21) Appl. No.: 10/727,792

(22) Filed: Dec. 3, 2003

(65) Prior Publication Data

US 2005/0138480 A1    Jun. 23, 2005

(51) Int. Cl.
*G06F 9/00* (2006.01)
(52) U.S. Cl. .................... 712/233; 712/216; 714/38
(58) Field of Classification Search ................ 712/233, 712/216; 714/38
See application file for complete search history.

(56) References Cited

U.S. PATENT DOCUMENTS 6,192,465 B1 * 2/2001 Roberts ...................... 712/212
6,542,984 B1 * 4/2003 Keller et al. ................ 712/214

OTHER PUBLICATIONS

"Reducing Branch Misprediction Penalties Via Dynamic Control Indpendence Detection"; Yuan Chou, Jason Fung, John Paul Shen; ACM 1999.*
"Branch Prediction Using Selective Branch Inversion"; Srilatha Manne, Artur Klauser, Dirk Grunwald; 1999.*
"Computer Architecture: A Quantitative Approach"; John Hennessy, David Patterson; pp. 209-210; May 2002.*

* cited by examiner

*Primary Examiner*—Alford Kindred
*Assistant Examiner*—Benjamin P Geib
(74) *Attorney, Agent, or Firm*—Blakely, Sokoloff, Taylor & Zafman LLP

(57) ABSTRACT

A method and apparatus for executing a selective recovery after a branch misprediction is disclosed. In one embodiment, the instructions following the mispredicted branch point may be saved for selective re-execution in a buffer. Those instructions that wrote to physical registers between the mispredicted branch point and an exact convergence point, thereby causing false data dependencies, may be followed by corresponding move instructions to eliminate the false data dependencies. The instructions subsequent to the exact convergence point may then be selectively re-executed if subject to the previous false data dependencies.

32 Claims, 8 Drawing Sheets

METHOD AND APPARATUS TO REDUCE MISPREDICTION PENALTY BY EXPLOITING EXACT CONVERGENCE

FIELD

The present disclosure relates generally to microprocessors, and more specifically to microprocessors capable of pipelined execution with branch prediction.

BACKGROUND

Modern microprocessors may support branch predictors in their architectures. In a pipelined architecture, the branch predictors may permit the fetch and execution of instructions subsequent to a branch point before the actual resolution of the conditional branch by execution of the branch instruction. This permits enhanced throughput when the branch predictor issues a correct prediction. There are many methods and hardware implementations for these branch predictors, but none of them are proof from errors. The enhanced throughput when the branch predictor issues a correct prediction must be weighed against the branch misprediction penalty that accrues when the branch predictor issues an incorrect prediction. The branch misprediction penalty may include such costs as stalling the pipeline during the branch misprediction recovery time and the execution of instructions along the mispredicted path that are potentially wasted.

Often in programs the two paths (correct and incorrect) of a branch reconnect at a future point, which may be called a convergence point. It would appear that, if the branch was executed along a mispredicted path to a convergence point and beyond, the recovery could consist of re-executing only a portion of the instructions along correct path that were executed on the mispredicted path, and re-use the results of the rest of the instructions on the correct path that were executed on the mispredicted path subsequent to the convergence point. However, this could not generally be accomplished as the renamed physical registers could be contaminated with data from execution of the mispredicted path instructions between the mispredicted path and the convergence point.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The following description describes techniques for a selective recovery from a branch misprediction in a processor, where some of the results of execution along the mispredicted path may be salvaged. In the following description, numerous specific details such as logic implementations, software module allocation, bus signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. In certain embodiments the invention is disclosed in the form of an Itanium® Processor Family (IPF) compatible processor or in a Pentium® family compatible processor such as those produced by Intel® Corporation. However, the invention may be practiced in other kinds of processors that may wish to use selective recovery following a branch misprediction.

Figure 1:
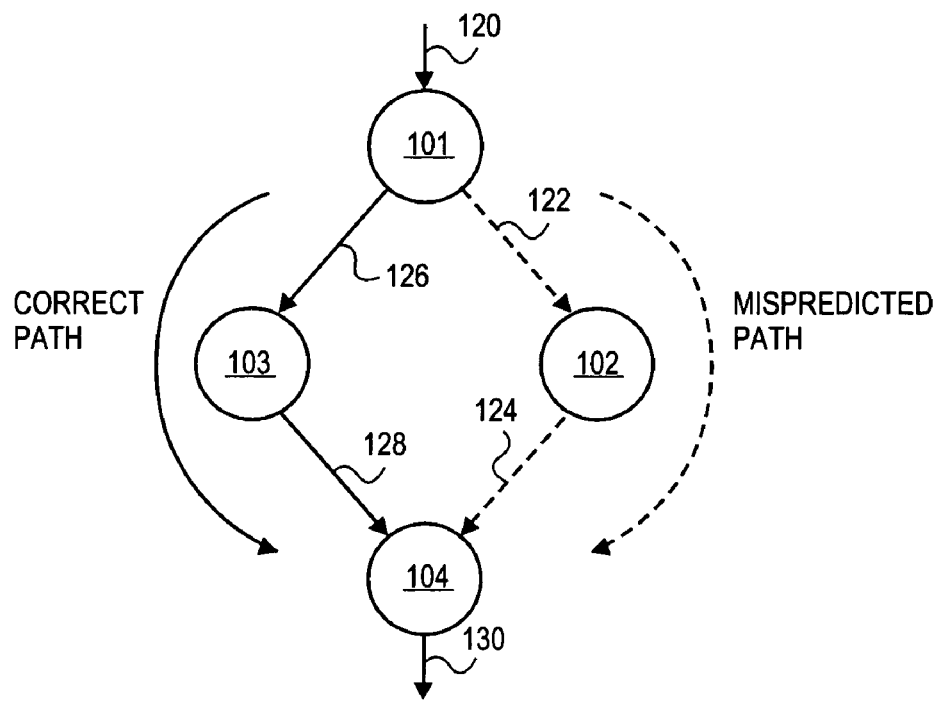
FIG. 1 is a diagram showing an example of control independence in a program, according to one embodiment.

Referring now to FIG. 1, a diagram showing an example of control independence in a program is shown, according to one embodiment. In diagrams appearing in the present disclosure, circles such as 101, 102, 103, and 104 may indicate software program basic blocks, and connecting arrows 120, 122, 124, 126, 128, and 130 may indicate connections that do not include any program instructions. FIG. 1 shows basic block 101 ending with a branch instruction, with conditional paths 122 and 126 emerging from basic block 101. During a given iteration, a branch predictor may make a misprediction of the result of the branch ending basic block 101 and send the execution flow down the mispredicted path including basic blocks 102 and 104. In this case the correct path includes basic blocks 103 and 104. Here the mispredicted path and the correct path merge at basic block 104, which may be called a convergence point. Basic block 104 and subsequent blocks will be executed independently of the outcome of the branch at the end of basic block 101, and for this reason blocks 104 and subsequent blocks are said to be control independent of the mispredicted branch.

It may be possible to re-use the results of instructions executed along the mispredicted path when performing the recovery from the misprediction, such as those past the convergence point in basic block 104. But to avoid having to re-fetch and re-register-rename these instructions, many additional actions may need to be performed. First the execution of the basic blocks of the mispredicted path between the mispredicted branch point and the convergence point, such as block 102, would need to be discarded. Then the control dependent blocks from the correct path, such as block 103, would need to be fetched into the pipeline. Finally the false data dependencies arising from execution of instructions along the mispredicted path would need to be nullified and the correct data dependencies restored, both between instructions in control independent blocks and instructions before the mispredicted branch (i.e. between blocks 104 and 101) and between instructions in control dependent and control independent blocks along the correct path (i.e. between blocks 104 and 103). The ability to perform all of these actions may require circuitry of such complexity that it would increase design complexity beyond what may be economically feasible. Additionally, it may take a large number of machine cycles to accomplish and may not be beneficial from a performance standpoint.

In many programs, a useful portion of control independencies may be of a simplified form known as an exact convergence. In an exact convergence, the mispredicted path converges exactly at the beginning of the correct path. This means that there are no instructions along the correct path between the mispredicted branch point and the convergence point. With no instructions existing along the correct path between the mispredicted branch point and the convergence point, there are simplifications that may accrue in not having to insert control dependent instructions (instructions in block 103) in the instruction window and re-establishing true data dependencies between the control independent instructions (instructions following convergent point, i.e. instructions in and after block 104) and newly inserted control dependent instructions in the instruction window (i.e. instructions in block 103). As these special convergence points arise during cases of exact convergence, they may be called exact convergence points.

Figure 2A:
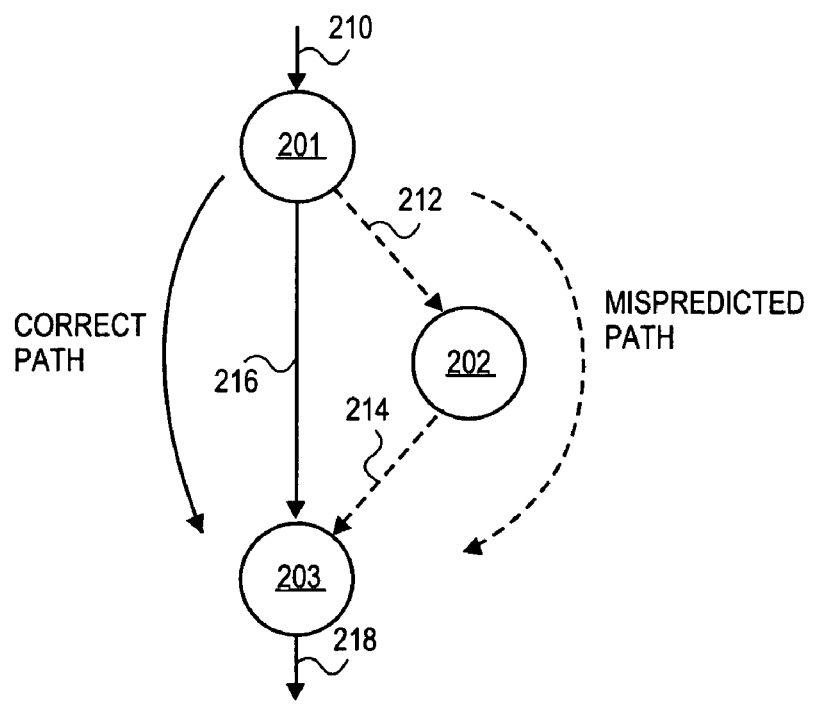
FIGS. 2A, 2B, and 2C are diagrams showing examples of exact convergence in a program, according to one embodiment.
Figure 2B:
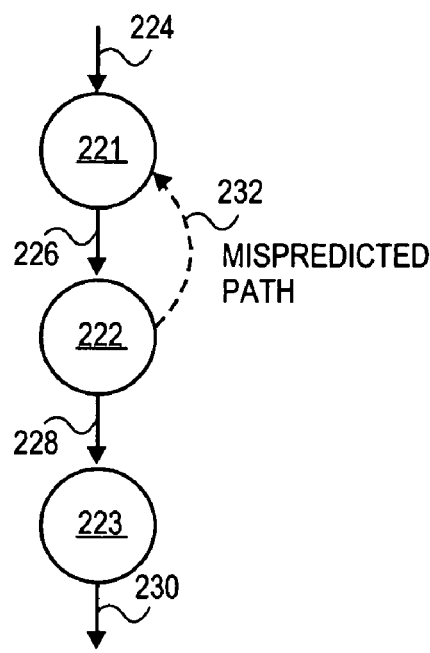
Figure 2C:
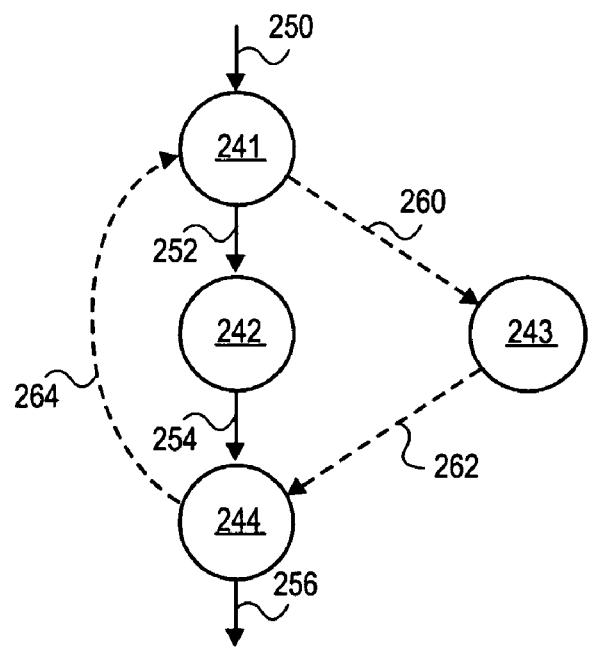

Referring now to FIGS. 2A, 2B, and 2C, diagrams showing examples of exact convergence in a program are shown, according to one embodiment. FIG. 2A shows a basic block 201 ending with a branch, and a convergence point at block 203. In the case that a mispredicted path goes along basic blocks 202, 203, and subsequent blocks as shown, the correct path is block 203 and subsequent blocks. Hence this is an exact convergence with block 203 being an exact convergence point. Notice that there are no instructions along the correct path between the mispredicted branch point at the end of block 201 and the convergence point at block 203.

FIG. 2B shows a loop where a branch ending block 222 may return to block 221. Here the mispredicted branch is at the end of block 222 and the convergence point is at block 223. In the case that a mispredicted path goes back along basic blocks 221 and 222, an extra loop iteration, and falls through block 223 and subsequent blocks as shown, the correct path is block 222 followed by block 223 and subsequent blocks. Hence this is an exact convergence with block 223 being an exact convergence point. Notice that there are no instructions along the correct path between the mispredicted branch point at the end of block 222 and the convergence point at block 223.

FIG. 2C shows a loop beginning in block 241 and ending in block 244. An exact convergence may occur when the loop is executed twice with alternating branch predictions occurring at the end of block 241. If the branch instruction at the end of block 241 is mispredicted, the mispredicted path may go through blocks 243 and 244, looping back to block 241. If on the next iteration of block 241 the branch instruction at the end of block 241 is predicted along the alternate path, through blocks 242 and 244, exact convergence occurs with block 242 being the exact convergence point.

Figure 3:
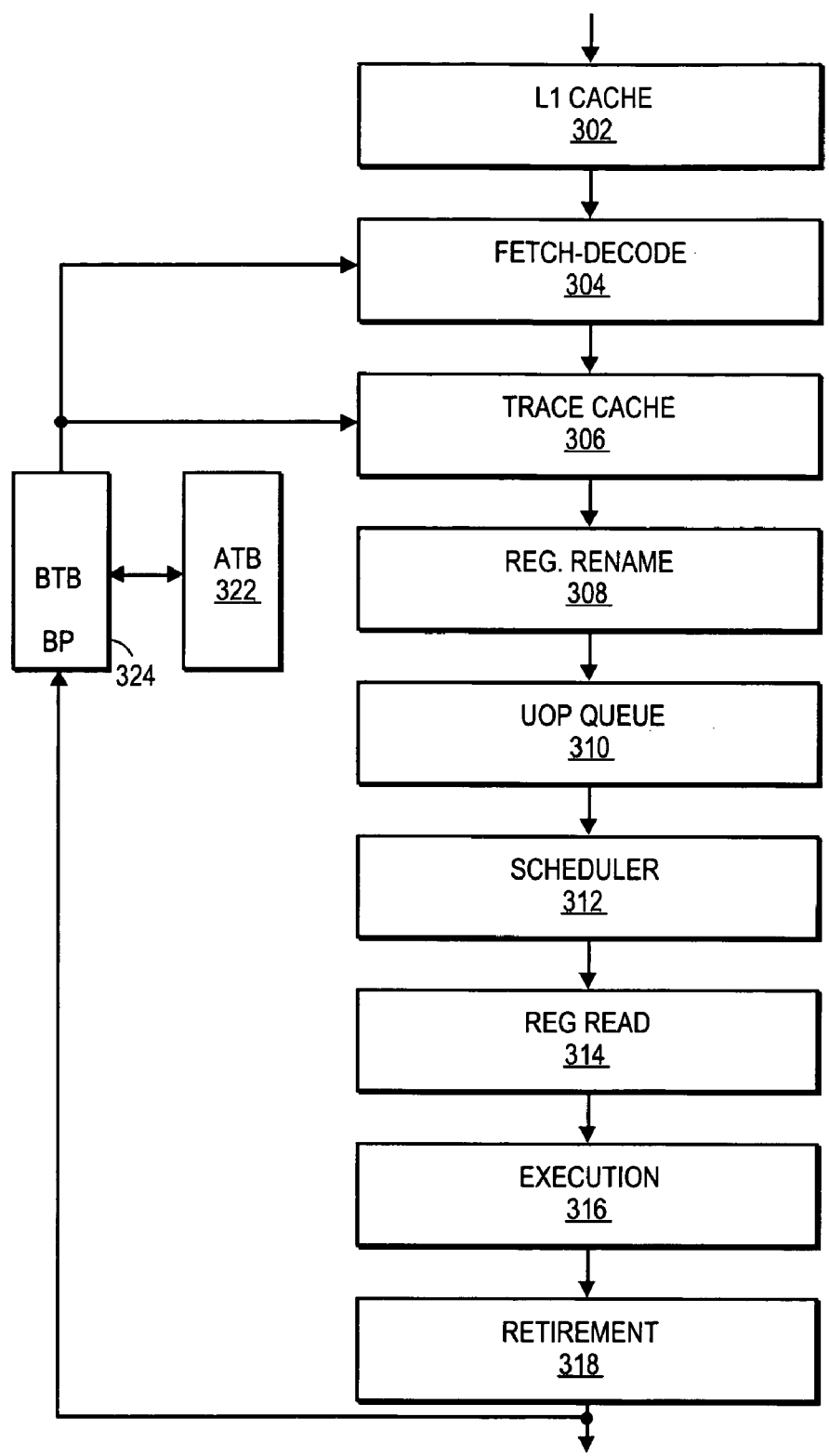
FIG. 3 is a schematic diagram of portions of a pipeline in a processor adapted for selective recovery, according to one embodiment of the present disclosure.

Referring now to FIG. 3, a schematic diagram of portions of a pipeline in a processor adapted for selective recovery is shown, according to one embodiment of the present disclosure. An L1 cache 302 may store instructions which may be fetched and decoded by a fetch-decode stage 304. Decoded instructions may be stored in a trace cache 306 or other form of instruction buffer. These instructions may have their operand logical registers mapped to operand physical registers in a register rename stage 308. The decoded and register-renamed instructions may be stored in a micro-operation queue 310 before being scheduled for execution in a scheduler stage 312. Once scheduled for execution, the instructions may read the operand registers in register read stage 314 before being executed in one or more execution units 316. If exceptions are not raised in the retirement stage 318, the results of the execution are used to update the machine state, including writing the results to destination operand registers in some embodiments.

Since the true outcome of a conditional branch instruction is not known until the instruction executes, a branch target buffer (BTB) and branch predictor 324 may be used to issue branch predictions to the fetch-decode stage 304 or, in some embodiments, also to the trace cache 306. The branch prediction may take the form of a predicted target address stored in the BTB of branch predictor 324. The branch predictor may have its history of branch execution updated by the retirement stage 318.

In one embodiment, exact convergence points may be identified through the use of an alternate target buffer (ATB) 322 attached to BTB and branch predictor 324. The ATB 322 may store the alternate target address for each branch instruction currently in the pipeline. Here the alternate target of a branch instruction may be the next sequential instruction address (when the branch instruction is predicted to be taken) or the branch target address supplied by the BTB (when the branch instruction is predicted to be not-taken). Then for each subsequent instruction fetched, the instruction's address is searched in the ATB 322. When a match is found, that fetched instruction is a potential exact convergence point. When the branch instruction, whose alternate target found a match in the ATB 322, completes execution, and the branch is found to be mispredicted, an improved recovery process, called selective recovery, may be initiated.

The selective recovery for mispredicted branch instructions with exact convergence may advantageously re-use instructions which have already been fetched, decoded, and register-renamed. These may be stored in the scheduler 312 or micro-operation queue 310 pending resolution of the branch instruction in the execution units 316 and retirement 318. It is noteworthy that, due to the definition of an exact convergence point, instructions starting from the very first instruction on the correct path will be encountered on the mispredicted path, and therefore some of the instructions along the correct path will have been previously fetched, and should already be present in the pipeline for recovery.

During branch misprediction recovery using selective recovery, the side effects of the non-convergent mispredicted path instructions (those instructions on the mispredicted path between the mispredicted branch instruction and the exact convergence point) on the convergent instructions (those instructions on the mispredicted path at or after the exact convergence point) need to be handled. One such side effect is a false data dependency. False data dependencies may occur when the source operands of a convergent instruction are modified by a non-convergent mispredicted path instruction. When this occurs, the convergent instruction may need to be re-executed with the correct data dependencies restored.

An example of a false data dependency may be shown in relation to the basic blocks of FIG. 2A. In block 201 let instruction I1 have destination register LR1 (logical register 1) which is mapped to PRx (physical register x). But then in block 202 along the mispredicted path, let instruction I2 and I3 have destination register LR1 which is mapped to PRy and PRz, respectively. As these occur within the non-convergent mispredicted path they induce false data dependencies. Then in block 203, containing convergent instructions, let instruction I4 have source register LR1. If the branch was correctly predicted, LR1 should have retained its mapping to PRx from I1, but due to the misprediction this was upset by the two instructions in block 202. When executed along the mispredicted path, I4 reads LR1 from PRz.

In order to correct this situation, in one embodiment when the branch misprediction is to be selectively recovered, the instructions on the non-convergent mispredicted path that write to registers may be transformed into move instructions, in some cases using a special control bit. These move instructions may then be re-issued from the scheduler 312 to the execution units 316. Each such move instruction may copy the value stored in its destination logical register's previously mapped physical register into the subsequently mapped physical register. For the above example, I2 could be transformed into MOVE LR1(PRx)->LR1(PRy) and I3 could be transformed into MOVE LR1(PRy)->LR1(PRz). Thus, after these move instructions are executed, instruction I4 may still be dependent upon I3 but the value present in PRz will be the correct value corresponding to PRx. Thus after all the move instructions are executed, I2 and I3 may be nullified, the false data dependency between I3 and I4 may be turned into a harmless data dependency, and the overall effect of the true data dependency between I1 and I4 was achieved through the register move instructions.

The read-after-write data dependencies between the move instructions replacing I2 and I3 may be enforced, when they are executed, by a scoreboard. In one embodiment, a scoreboard may have a flag for each of the physical registers present. The individual flags may be set when the corresponding physical register is written into by a recovery move instruction as described in the above example. Then the convergent instructions along the mispredicted path which were previously executed may be re-executed if their source registers are flagged in the scoreboard. The individual flags in the scoreboard may be cleared when subsequent convergent instructions write to the corresponding physical registers. In one embodiment, the scoreboard may be included within scheduler 312.

To summarize, to selectively recover from a mispredicted branch, the false data dependencies should be eliminated, the true data dependencies should be restored, and those instructions taking source operands from affected physical registers need to be re-executed. This permits using instructions previously fetched, decoded, register-renamed, and executed along the mispredicted path.

Figure 4:
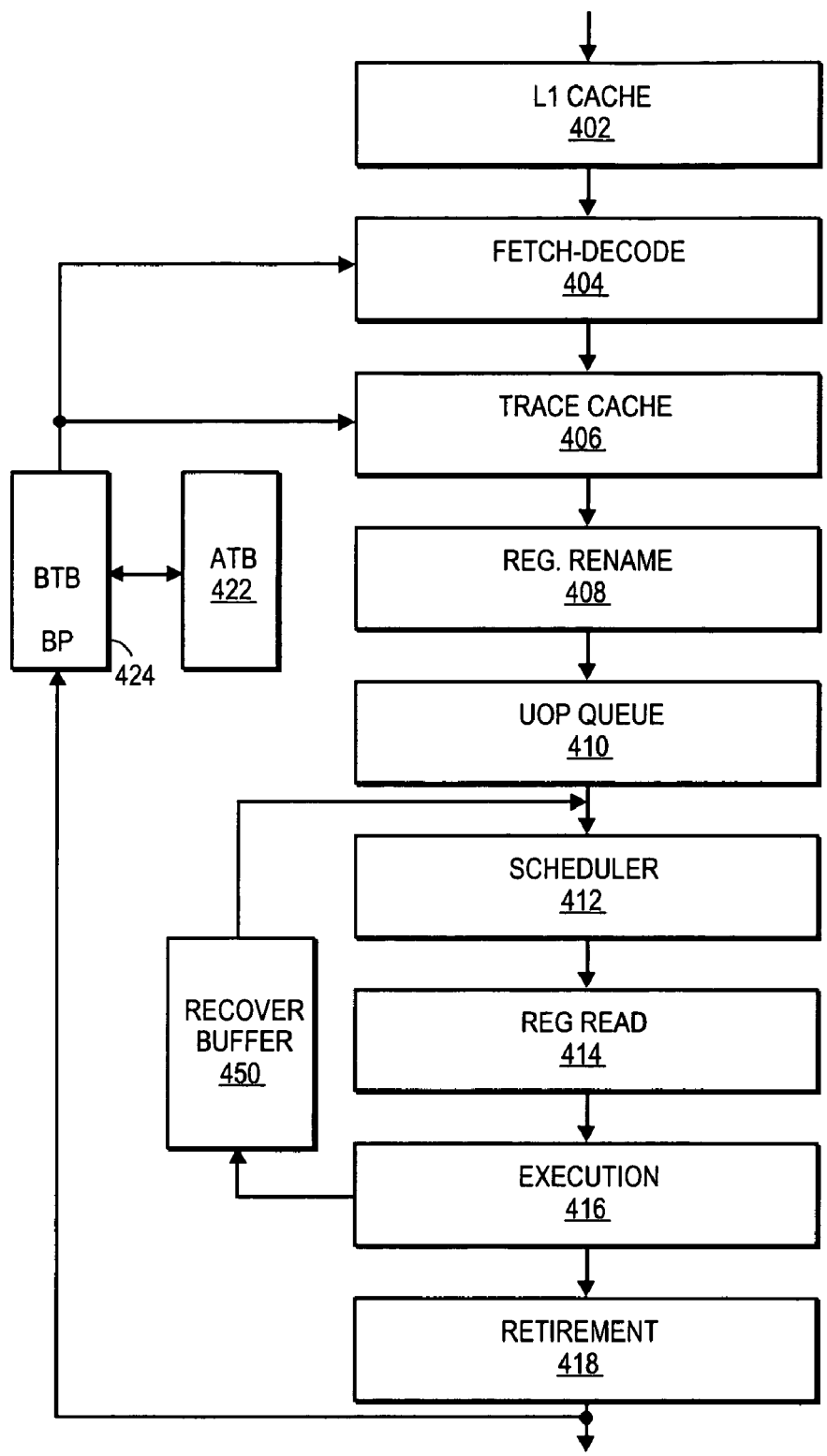
FIG. 4 is a schematic diagram of portions of a pipeline in a processor adapted for selective recovery, according to another embodiment of the present disclosure.

Referring now to FIG. 4, a schematic diagram of portions of a pipeline in a processor adapted for selective recovery is shown, according to another embodiment of the present disclosure. Storing all of the mispredicted path instructions in the scheduler may be difficult. Either the scheduler needs to be increased in capacity, which may impact the overall processor design, or the processor must be stalled more frequently. Therefore in one embodiment a recovery buffer 450 may be used. The recovery buffer 450 may store the previously-executed instructions for possible use in selective recovery operations.

There may be several embodiments of the operation of recovery buffer 450. In one embodiment, the recovery buffer 450 may simply re-issue all of the instructions subsequent to the mispredicted branch instruction. While this embodiment is simple, it may unnecessarily re-issue instructions that do not need to be re-executed.

In another embodiment, the recovery buffer 450 may re-issue only dependent chains of instructions that need re-execution. The recovery buffer may be searched through for the instructions contained therein for these dependent chains. In this case the recovery buffer 450 may make use of a scoreboard method. The instructions on the convergent path needing re-execution can be identified by another scoreboard mechanism to re-issue the convergent instructions that consume the flagged physical registers.

In another embodiment, the dependent chains of instructions may be derived as instructions are being placed into recovery buffer 450. No sequential search may be needed but there may be a greatly increased logical complexity to determine a priori these dependent chains.

Figure 5:
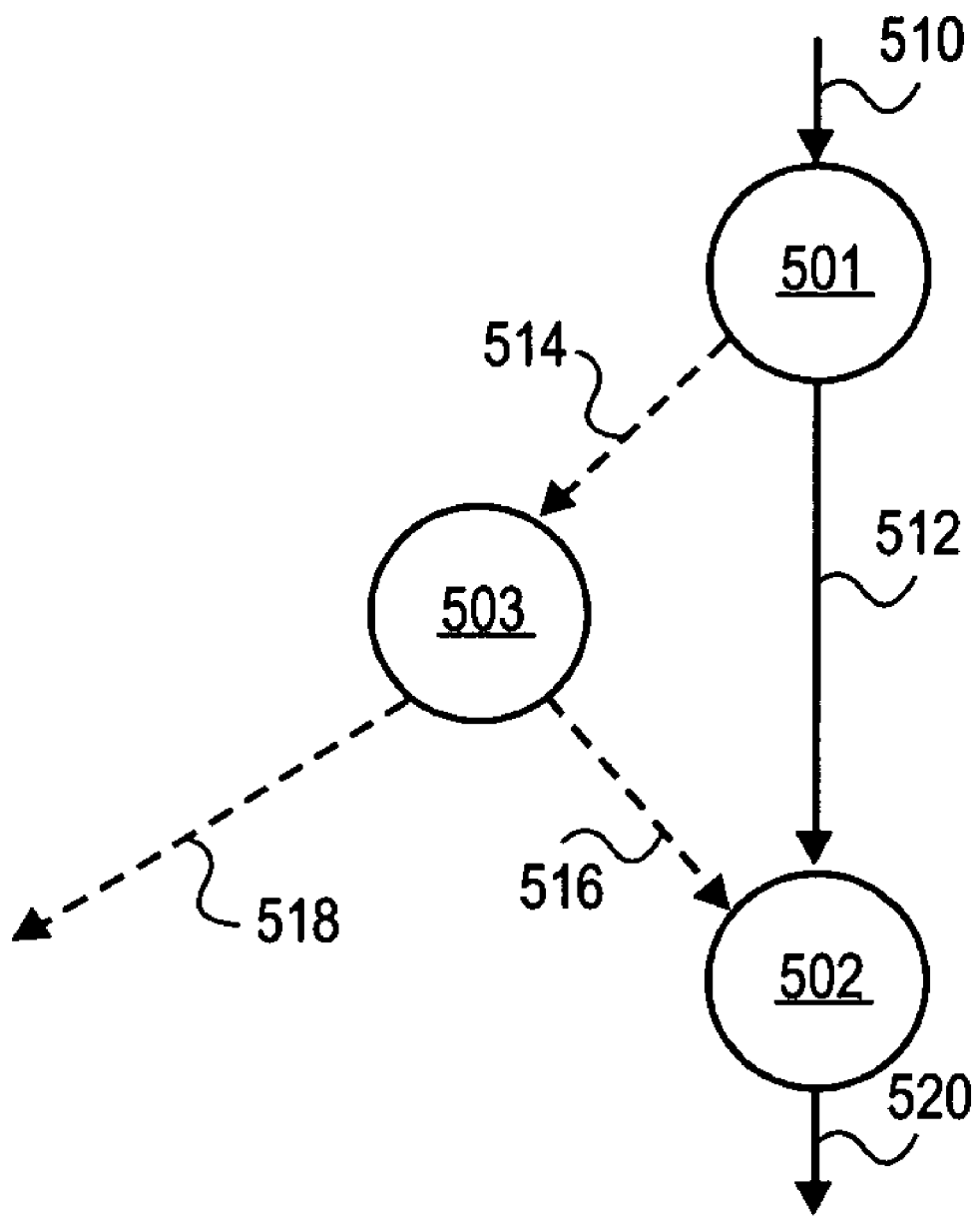
FIG. 5 is a diagram showing an example of inducing exact convergence in a program, according to one embodiment of the present disclosure.

Referring now to FIG. 5, a diagram showing an example of inducing exact convergence in a program is shown, according to one embodiment of the present disclosure. The exact convergence examples of FIGS. 2A, 2B, and 2C may be called natural exact convergence. In contrast to these, sometimes the execution flow may be altered to force an exact convergence point. In the FIG. 5 example, the branch instruction at the end of block 501 was mispredicted, causing a mispredicted path including block 503. Block 503 ends with a second branch instruction, which in the event is predicted to go along arrow 518. However, it may be noted that if the branch instruction at the end of block 503 exited along arrow 516, an exact convergence would result. Hence that branch prediction could be reversed to force the existence of an induced exact convergence point. Branch confidence information may also be used to decide whether or not to reverse a branch. Either the branch prediction for the branch at the end of block 501 or at the end of block 503, or both, may need to be of low-confidence. If the branch prediction for the branch instruction at the end of block 501 turns out to be a misprediction, then the techniques of selective recovery discussed above could be applied due to the induced exact convergence point.

Figure 6:
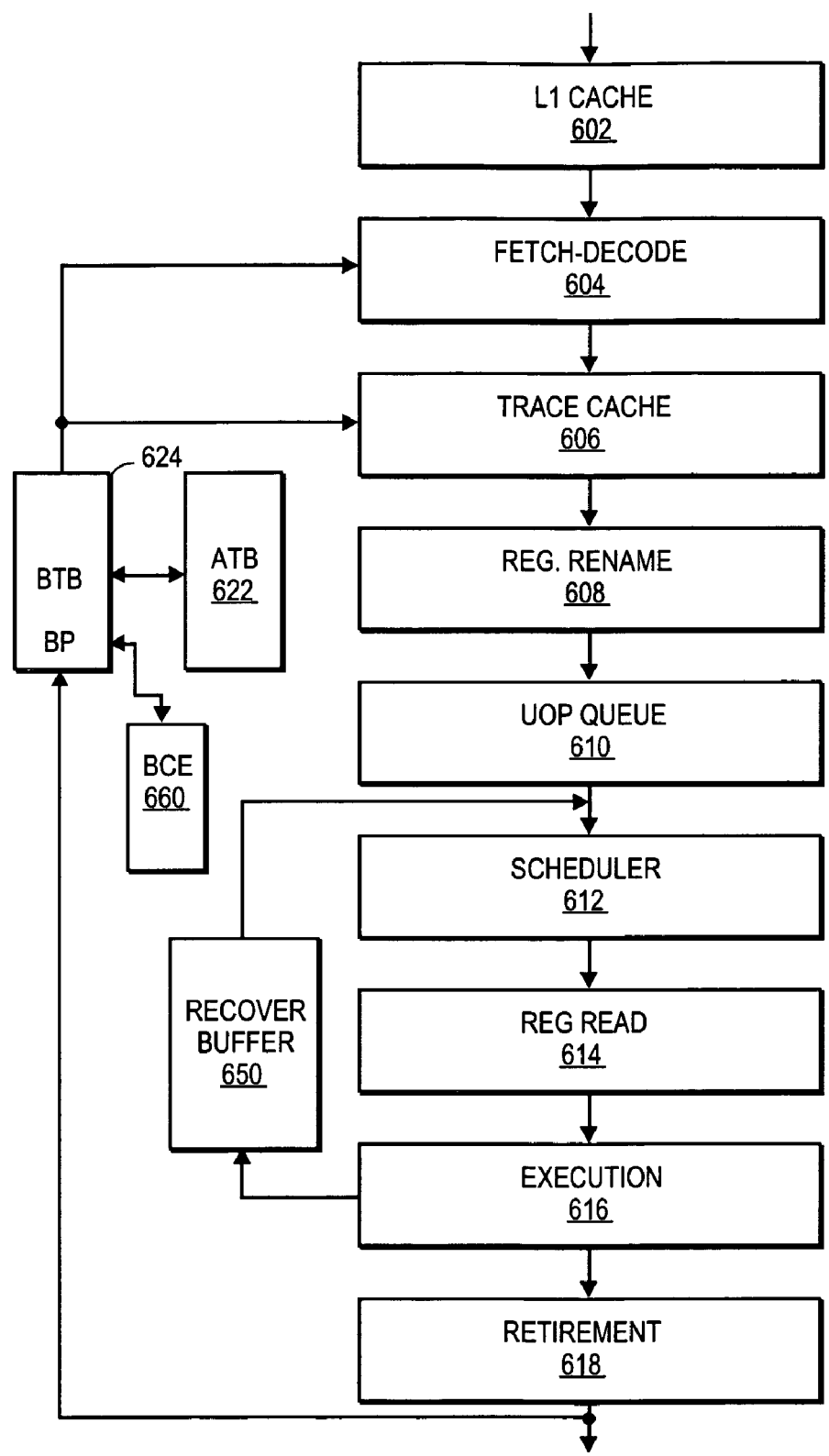
FIG. 6 is a schematic diagram of portions of a pipeline in a processor adapted for selective recovery and inducing exact convergence, according to one embodiment of the present disclosure.

Referring now to FIG. 6, a schematic diagram of portions of a pipeline in a processor adapted for selective recovery and inducing exact convergence is shown, according to one embodiment of the present disclosure. The process includes reversing the branch prediction of a candidate branch along the mispredicted path when the alternate target of the candidate branch matches the alternate target of the mispredicted branch.

Several determinations may be used to implement induced exact convergence. A candidate branch should be identified, possibly one with a low confidence value for its branch prediction sited along the mispredicted path. Also a determination should be made whether the alternate target of a candidate branch matches the alternate target of the original mispredicted branch instruction. These functions may be supported by the circuitry shown in FIG. 6: the ATB 622, which may be similar to the ATB 322, 422 of FIGS. 3 and 4, and the branch confidence estimator BCE 660. In one embodiment, the BCE 660 may be a perceptron-based branch confidence estimator that may be trained using branch outcome information. In other embodiments, the BCE 660 may use other forms of branch confidence estimators.

In one embodiment, each low confidence branch may be treated as a potential mispredicted branch, and any subsequent branch may be treated as a potential candidate branch. When such a subsequent branch is fetched, it may be treated as a candidate branch, and its alternate target (with respect to the predicted target issued by the branch predictor) may be compared with the alternate target of each low-confidence branch in the ATB 622. When a match is found, the branch prediction for the candidate branch may be reversed and the target for that candidate branch may be the alternate target found in the ATB 622. In other embodiments, both the potential mispredicted branch and the potential candidate branch may be required to have low confidence values, or any branch may be considered as a potential mispredicted branch but the potential candidate branch may be required to have a low confidence value. In any of these embodiments, the induced exact convergence point resulting may be used to support selective recovery.

Figure 7A:
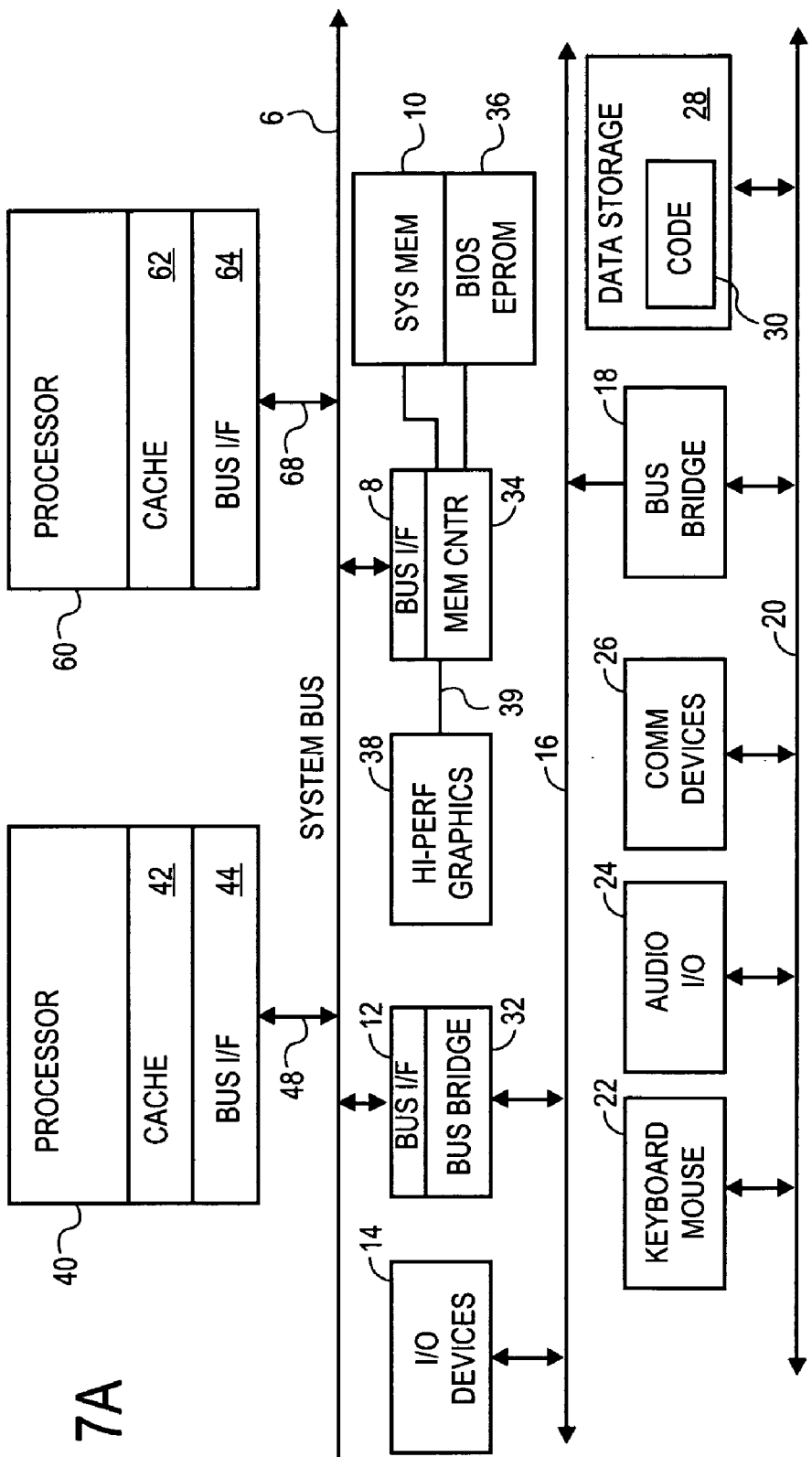
FIGS. 7A and 7B are schematic diagrams of systems including a processor supporting selective recovery, according to two embodiments of the present disclosure.
Figure 7B:
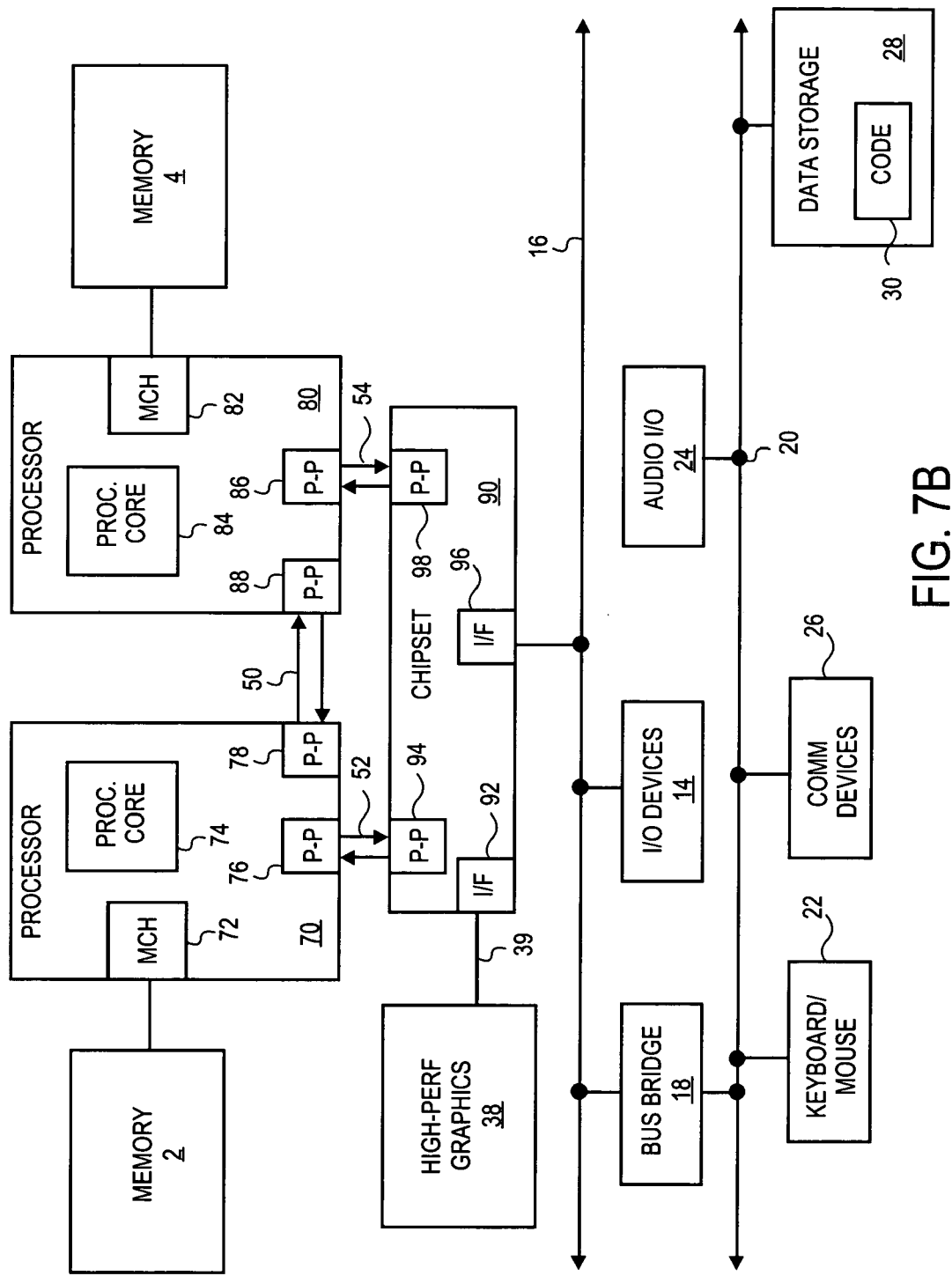

Referring now to FIGS. 7A and 7B, schematic diagrams of systems including a processor supporting execution of speculative threads are shown, according to two embodiments of the present disclosure. The FIG. 7A system generally shows a system where processors, memory, and input/output devices are interconnected by a system bus, whereas the FIG. 7B system generally shows a system where processors, memory, and input/output devices are interconnected by a number of point-to-point interfaces.

The FIG. 7A system may include several processors, of which only two, processors 40, 60 are shown for clarity. Processors 40, 60 may include level one caches 42, 62. The FIG. 7A system may have several functions connected via bus interfaces 44, 64, 12, 8 with a system bus 6. In one embodiment, system bus 6 may be the front side bus (FSB) utilized with Pentium® class microprocessors manufactured by Intel® Corporation. In other embodiments, other busses may be used. In some embodiments memory controller 34 and bus bridge 32 may collectively be referred to as a chipset. In some embodiments, functions of a chipset may be divided among physical chips differently than as shown in the FIG. 7A embodiment.

Memory controller 34 may permit processors 40, 60 to read and write from system memory 10 and from a basic input/output system (BIOS) erasable programmable read-only memory (EPROM) 36. In some embodiments BIOS EPROM 36 may utilize flash memory. Memory controller 34 may include a bus interface 8 to permit memory read and write data to be carried to and from bus agents on system bus 6. Memory controller 34 may also connect with a high-performance graphics circuit 38 across a high-performance graphics interface 39. In certain embodiments the high-performance graphics interface 39 may be an advanced graphics port AGP interface. Memory controller 34 may direct read data from system memory 10 to the high-performance graphics circuit 38 across high-performance graphics interface 39.

The FIG. 7B system may also include several processors, of which only two, processors 70, 80 are shown for clarity. Processors 70, 80 may each include a local memory controller hub (MCH) 72, 82 to connect with memory 2, 4. Processors 70, 80 may exchange data via a point-to-point interface 50 using point-to-point interface circuits 78, 88. Processors 70, 80 may each exchange data with a chipset 90 via individual point-to-point interfaces 52, 54 using point to point interface circuits 76, 94, 86, 98. Chipset 90 may also exchange data with a high-performance graphics circuit 38 via a high-performance graphics interface 92.

In the FIG. 7A system, bus bridge 32 may permit data exchanges between system bus 6 and bus 16, which may in some embodiments be a industry standard architecture (ISA) bus or a peripheral component interconnect (PCI) bus. In the FIG. 7B system, chipset 90 may exchange data with a bus 16 via a bus interface 96. In either system, there may be various input/output I/O devices 14 on the bus 16, including in some embodiments low performance graphics controllers, video controllers, and networking controllers. Another bus bridge 18 may in some embodiments be used to permit data exchanges between bus 16 and bus 20. Bus 20 may in some embodiments be a small computer system interface (SCSI) bus, an integrated drive electronics (IDE) bus, or a universal serial bus (USB) bus. Additional I/O devices may be connected with bus 20. These may include keyboard and cursor control devices 22, including mice, audio I/O 24, communications devices 26, including modems and network interfaces, and data storage devices 28. Software code 30 may be stored on data storage device 28. In some embodiments, data storage device 28 may be a fixed magnetic disk, a floppy disk drive, an optical disk drive, a magneto-optical disk drive, a magnetic tape, or non-volatile memory including flash memory.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A processor, comprising:
    a branch predictor to issue a first branch prediction at a branch point in a program;
    a first circuit to identify an exact convergence point subsequent to said branch point in said program, said exact convergence point being a point at which a path mispredicted from said branch point converges with a correct path at a point of said correct path immediately following said branch point;
    a scheduler to store instructions of said program subsequent to said branch point when said branch prediction is a misprediction, said scheduler to re-execute selected instructions of said program subsequent to said branch point, upon identifying said exact convergence point; and
    a second circuit to track a first set of physical registers written subsequent to said branch point.

2. The processor of claim 1, wherein said selected instructions include a first set of instructions of said program whose source physical registers were tracked by said second circuit.

3. The processor of claim 1, wherein said scheduler further executes move instructions corresponding to a second set of instructions that write to said first set of physical registers prior to said exact convergence point.

4. The processor of claim 1, further comprising a recovery buffer to store said selected instructions outside said scheduler.

5. The processor of claim 1, wherein said branch predictor includes a branch target buffer to store target addresses indexed by branch locations in said program and wherein said first circuit includes an alternate target buffer coupled to said branch target buffer for determining said exact convergence point.

6. The processor of claim 5, wherein said branch predictor includes a branch confidence estimator to reverse a second branch prediction of low confidence to induce an induced exact convergence point.

7. The processor of claim 1, wherein said second circuit is a scoreboard including a set of flags corresponding to a set of physical registers, wherein one of said set of flags is set when a corresponding one of said set of physical registers is written between said branch point and said exact convergence point.

8. The processor of claim 7, wherein said one of said set of flags is cleared when said corresponding one of said set of physical registers is written subsequent to said exact convergence point.

9. A method, comprising:
   storing a set of instructions of a program subsequent to a mispredicted branch point;
   tracking a set of physical registers written by a first selected subset of said set of instructions; and
   re-executing a second selected subset of said set of instructions, subsequent to an exact convergence point, that use a first one of said set of physical registers as a source operand register, upon identifying said exact convergence point, said exact convergence point being a point at which a path mispredicted from said mispredicted branch point converges with a correct path at a point of said correct path immediately following said mispredicted branch point.

10. The method of claim 9, wherein said tracking includes setting a flag for a second one of said set of physical registers written on a mispredicted path subsequent to said mispredicted branch point.

11. The method of claim 10, further comprising clearing said flag when an instruction subsequent to said exact convergence point uses said second one of said set of physical registers as a source register.

12. The method of claim 9, wherein said storing includes placing said set of instructions in a restore buffer prior to reloading them into a scheduler.

13. The method of claim 9, wherein said restoring includes executing a corresponding move instruction for each of said first selected subset of said set of instructions.

14. The method of claim 9, further comprising reversing a branch prediction of a subsequent branch point to induce said exact convergence point.

15. A system, comprising:
   a processor including a branch predictor to issue a first branch prediction at a branch point in a program, a first circuit to identify an exact convergence point subsequent to said branch point in said program, said exact convergence point being a point at which a path mispredicted from said branch point converges with a correct path at a point of said correct path immediately following said branch point, a scheduler to store instructions of said program subsequent to said branch point when said branch prediction is a misprediction, said scheduler to re-execute selected instructions of said program subsequent to said branch point, upon identifying said exact convergence point, and a second circuit to track a first set of physical registers written subsequent to said branch point;
   an interface to couple said processor to input-output devices; and
   an audio input-output device coupled to said interface to receive audio data from said processor.

16. The system of claim 15, wherein said selected instructions include a first set of instructions of said program whose source physical registers were tracked by said second circuit.

17. The system of claim 15, wherein said scheduler further executes move instructions corresponding to a second set of instructions that write to said first set of physical registers prior to said exact convergence point.

18. The system of claim 15, further comprising a recovery buffer to store said selected instructions outside said scheduler.

19. The system of claim 15, wherein said branch predictor includes a branch target buffer to store target addresses indexed by branch locations in said program and wherein said first circuit includes an alternate target buffer coupled to said branch target buffer for determining said exact convergence point.

20. The system of claim 19, wherein said branch predictor includes a branch confidence estimator to reverse a second branch prediction of low confidence to induce an induced exact convergence point.

21. The system of claim 15, wherein said second circuit is a scoreboard including a set of flags corresponding to a set of physical registers, wherein one of said set of flags is set when a corresponding one of said set of physical registers is written between said branch point and said exact convergence point.

22. The system of claim 21, wherein said one of said set of flags is cleared when said corresponding one of said set of physical registers is written subsequent to said exact convergence point.

23. An apparatus, comprising:
   means for storing a set of instructions of a program subsequent to a mispredicted branch point;
   means for tracking a set of physical registers written by a first selected subset of said set of instructions; and
   means for re-executing a second selected subset of said set of instructions, subsequent to an exact convergence point, that use a first one of said set of physical registers as a source operand register, upon identifying said exact convergence point, said exact convergence point being a point at which a path mispredicted from said mispredicted branch point converges with a correct path at a point of said correct path immediately following said mispredicted branch point.

24. The apparatus of claim 23, wherein said means for tracking includes means for setting a flag for a second one of said set of physical registers written on a mispredicted path subsequent to said mispredicted branch point.

25. The apparatus of claim 24, further comprising means for clearing said flag when an instruction subsequent to said exact convergence point uses said second one of said set of physical registers as a source register.

26. The apparatus of claim 23, wherein said means for storing includes means for placing said set of instructions in a restore buffer prior to reloading them into a scheduler.

27. The apparatus of claim 23, wherein said means for restoring includes means for executing a corresponding move instruction for each of said first selected subset of said set of instructions.

28. The apparatus of claim 23, further comprising means for reversing a branch prediction of a subsequent branch point to induce said exact convergence point.

29. The processor of claim 1, wherein said scheduler further uses move instructions to correct false data dependencies from the path mispredicted.

30. The processor of claim 29, wherein using move instructions further comprises transforming write instructions to data dependent registers into move instructions.

31. The processor of claim 1, wherein said scheduler further restores true data dependencies from false data dependencies.

32. The processor of claim 31, wherein restoring true data dependencies further comprises correcting false data dependency values in physical registers.

* * * * *